United States Patent [19]

Martin, Sr.

[11] 4,099,590

[45] Jul. 11, 1978

[54] SOUND ATTENUATING ENGINE COVER

[76] Inventor: Robert P. Martin, Sr., 7809 W. 130th St., Parma, Ohio 44130

[21] Appl. No.: 769,318

[22] Filed: Feb. 17, 1977

[51] Int. Cl.² ........................................... B62D 25/10
[52] U.S. Cl. .................................................. 180/69 C
[58] Field of Search ................... 180/69 R, 69 C, 89.1; 296/76; 181/33 K

[56] References Cited

U.S. PATENT DOCUMENTS

| | | | |
|---|---|---|---|
| 2,931,452 | 4/1960 | Mackie | 180/69 C |
| 3,232,368 | 1/1966 | Sullivan | 180/69 C |
| 4,040,501 | 8/1977 | Haswell | 180/69 C X |

Primary Examiner—Joseph F. Peters, Jr.
Assistant Examiner—Gene A. Church

Attorney, Agent, or Firm—McNenny, Pearne, Gordon, Gail, Dickinson & Schiller

[57] ABSTRACT

An engine cover in an industrial lift truck forming a sound barrier between the engine and operator's station to reduce engine-related noise reaching the operator's station to acceptable levels particularly where the operator's station and engine cover are enclosed by a cab. The engine cover is provided with a double rigid wall construction comprised of an outer shell and an inner liner complementary in configuration to the shell and nested within it. The shell and liner components are mutually supported and spaced a predetermined distance by continuous support means generally along their peripheries and are free of mutual support in their central areas.

10 Claims, 3 Drawing Figures

SOUND ATTENUATING ENGINE COVER

BACKGROUND OF THE INVENTION

The invention relates to soundproofing devices and, in particular, to a cover for reducing transmitted engine noise.

PRIOR ART

High noise environments are recognized as harmful to personnel, since it has been demonstrated that noise can cause permanent hearing loss, fatigue, and irritability. Further, noise can give rise to safety hazards by obstructing audio communication. Because of these harmful effects, government regulation has been imposed to restrict noise levels developed by various classes of machinery. Silencing industrial lift trucks presents particularly difficult problems which result from their common use of internal combustion engines as prime movers. Lubrication oils, greases, and fuels characteristically become deposited on surfaces surrounding or forming an engine compartment. Such deposits may diminish the effectiveness of sound-absorbing surfaces or coatings in addition to creating a fire hazard. Moreover, sound-absorbing panels employing porous materials, once fouled by grimy deposits, are not readily cleaned. Additional considerations involved in the design of a practical soundproofing engine enclosure include structural rigidity, resistance to damage under impact, ease of fabrication into the irregular configurations, and economy.

SUMMARY OF THE INVENTION

The invention provides an engine cover for a lift truck which employs a double wall construction to significantly reduce transmitted engine noise and thereby lower the level of noise reaching an operator. The invention contemplates a rigid liner disposed within and secured to an outer unit or shell corresponding to a normally provided engine cover. The inner liner, preferably formed as an integral unit, is joined to the outer shell at its periphery, while central regions of the liner and shell are free of mutual support. The double wall structure contemplated by the invention demonstrates a remarkable reduction in sound transmission, while affording a construction which is practical when both service life and economy are considered.

In the preferred embodiment, the liner of the sound-attenuating cover is an imperforate sheetlike structure, formed of plastic such as a fiberglass-reinforced, polyester resin composite material having high chemical resistance to normally encountered lubricating oils, greases, and petroleum fuels. The fiberglass-reinforced plastic material is fabricated into a complex shape, with characteristically low investment in tooling and labor.

The invention is advantageously employed in retrofit applications, since an original equipment cover is readily employed as an outer shell and fitted with an inner liner having a configuration complementary to it. Often where a lift truck is fitted with a cab enclosure, noise levels within the enclosure are amplified beyond acceptable levels. In such situations, the double wall engine cover of the invention is capable of reducing noise transmitted to the enclosure to a satisfactory low level.

DESCRIPTION OF THE PREFERRED EMBODIMENT

Figure 1:
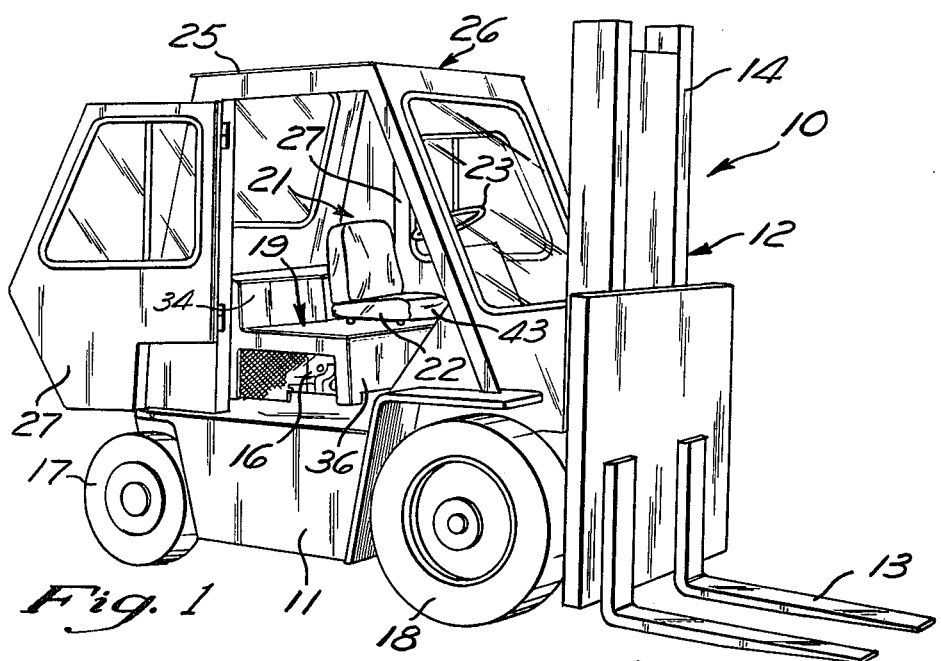
FIG. 1 is a perspective side view of a lift truck employing an engine cover constructed in accordance with the invention.
Figure 2:
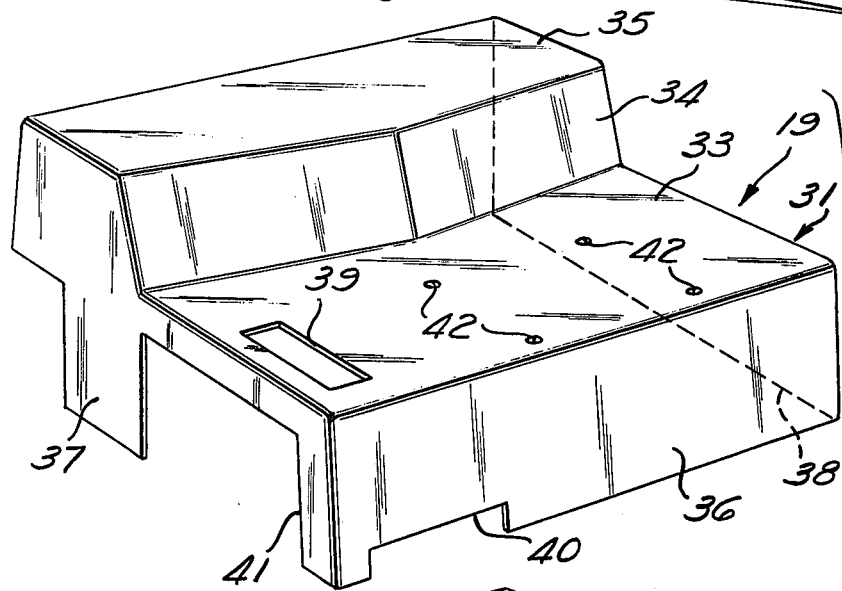
FIG. 2 is a perspective, exploded view of the engine cover.

Referring now in greater detail to the drawing, there is shown a lift truck 10 of known construction having a wheeled chassis 11 and a lifting mechanism 12, including a fork 13 and mast 14 at a front of the chassis. An internal combustion engine 16 or other prime mover is carried on the chassis 11 adjacent its rear wheels 17 and arranged to drive its front wheels 18. A cover 19 described in greater detail below is disposed over the engine 16. An operator's station, indicated in general at 21, includes a seat 22 and steering wheel 23.

A cab enclosure 26 mounted on the chassis 11 protects an operator against weather, dust, falling objects, rollover, and like hazards. In the illustrated example, the cab 26, including a top panel 25, is fabricated of steel structural and sheet elements with four generally vertical faces being provided with windows. As seen in FIG. 1, each side face of the cab 26 is provided with a door 27 for passage of the operator.

The engine cover 19, which is substantially fully within the cab 26, is hinged or otherwise movably mounted on the chassis 11 in a conventional manner for access to the engine 16. The engine cover 19, constructed in accordance with the invention, comprises an outer shell 31 and an inner liner 32. In the illustrated example, the outer shell 31 is a complex, thin-walled, boxlike structure, including a horizontal top panel 33, step-up panels 34 and 35, a front panel 36 and opposed side panels 37 and 38. The illustrated shell 31 is fabricated by integrally molding the various sheetlike panels 33-38 of rigid plastic such as a conventional composite of fiberglass-reinforced polyester resin. The shell has a nominal wall thickness of, for example, ⅛ inch. Certain ones of the panels 33, 36, and 37 are provided with cutouts 39, 40, and 41 for purposes of access, clearance, and ventilation and the like, normally afforded in the particular model of lift truck illustrated.

A set of four holes 42 in the top panel 33 are provided for mounting the operator's seat 22 with suitable bolts. As shown, the various shell panels 33-38 are generally planar, and with regard to the top, front, and side panels 33 and 36-38 are generally perpendicular to one another. With the exception of the local cutouts 39-41 and seat mounting holes 42, the shell 31 is imperforate throughout substantially its entire surface area. As shown, the vertical front panel 36 of the shell 31 lies at or immediately behind a front edge 43 of the operator's seat 22, while the horizontal top panel 33 lies immediately below the seat.

The liner 32 has a configuration complementary to the shell 31 so that it may be nested within the latter. Like the disclosed shell 31, the liner 32 is preferably fabricated by molding rigid plastic material, such as a composite of fiberglass-reinforced, polyester resin with a nominal thickness of, for example, ⅛ inch. The liner includes a top panel 44, step-up panels 45 and 46, a front panel 47 and opposed side panels 48 and 49, all integrally formed with one another and arranged relative to one another like the corresponding panels of the shell 31. Cutouts indicated at 51 and 52 are provided for purposes of clearance with elements on the chassis or motor, for example, associated with the particular model of the disclosed lift truck.

Figure 3:
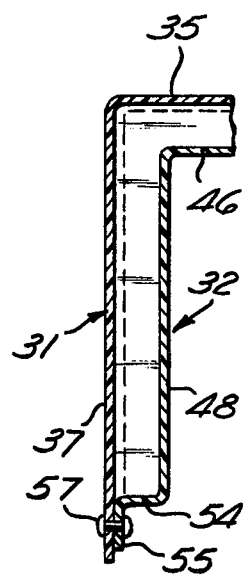
FIG. 3 is a fragmentary, cross sectional view of the engine cover.

Along substantially the full periphery of the liner 32 there is integrally formed a mounting or support structure which comprises web segments 54, each generally perpendicular to its associated panel and contiguous flange segments 55, each generally parallel to its associated panel. As suggested in FIG. 3, the various flange segments 55 are arranged to abut with the underside surfaces of the shell 31 along substantially the full periphery of the liner 32. The depth of the web segments 54 is dimensioned to result in a spacing between the interior surfaces of the shell 31 and liner 32 of approximately one inch. As suggested in the drawing, the central areas of the liner 31 and shelf 32 are free of support from one another.

In the disclosed embodiment, the shell 31 and liner 32 are assembled by applying a suitable adhesive such as epoxy along the full peripheral extent of the flange segments 55. Before the adhesive sets, the liner 32 is positioned within the shell 31 and secured thereto with a plurality of pop rivets 57 or other mechanical fasteners to maintain the relative position of the shell and liner. Thereafter, the adhesive is allowed to fully set. The cover assembly 19, comprising the shell 31 and liner 32, forms a barrier of sufficient width, height, and length to intercept substantially all of the airborne noise emanating at the engine 16 or its immediate surroundings and traveling directly toward the operator's station 21. Where, as shown, the lift truck is fitted with a cab enclosure 26, noise surrounding the operator's station is ordinarily amplified to objectionable levels. The disclosed cover 19, by limiting the transmission of the engine noises, protects the operator from excessive noise levels even when the cab enclosure 26 is used.

The disclosed liner and shell assembly 19 has demonstrated a surprising efficiency in noise reduction which is superior to that of conventional approaches using damping materials such as mastic coating or absorbers such as fiberglass applied to the underside of a conventional cover. Efficiency of the cover assembly 19 is apparently due to the substantially closed and dead air space between the shell 31 and liner 32, resulting from the substantially continuous structure of the web and flange mounting structure 54 and 55 and the absence of support between the central areas of the liner and shell, which would directly transmit vibration of one of these elements to the other.

Use of molded rigid plastic as an acoustic barrier element, as in the liner 23, is particularly well suited to the environment and conditions to which an engine cover of an industrial lift truck is subjected. Lubricating greases, oils, and fuels are readily wiped off the interior surfaces of the liner so that hazardous accumulations are easily avoided. The impact resistance of suitable rigid plastic materials avoids damage due to accidental impact with tools or rough handling. The disclosed cover assembly 19 is especially suited for retrofit applications where the original factory cover is employed as the outer shell and an interior liner having a complementary shape is secured to its interior surfaces.

The invention is not restricted to the slavish imitation of each and every detail set forth above. Obviously, devices may be provided which change, eliminate, or add certain specific details without departing from the scope of the invention.

What is claimed is:

1. A lift truck including a chassis, an internal combustion engine mounted on the chassis, an operator's station including a seat and a steering wheel, an engine cover disposed between the engine and operator's station, said engine cover extending across a zone sufficiently large to intercept substantially all airborne noise originating at or immediately adjacent the engine and traveling in the direction of the operator's station, components of said engine cover including an outer shell and in inner liner, said shell and liner each being thin-walled, relatively rigid structures, said liner having a general configuration like that of said shell, said liner being spaced a predetermined distance from said shell, and support means extending generally along the periphery of one of said components to maintain the predetermined distance between said liner and said shell, said liner and shell being substantially free of support between one another inwardly of the periphery of said one component.

2. A lift truck as set forth in claim 1, wherein said support means is integral with one of said components.

3. A lift truck as set forth in claim 2, wherein said support means includes a thin-walled web portion extending generally perpendicularly from adjacent main portions of said one component.

4. A lift truck as set forth in claim 3, wherein said support means includes flange portions spaced from and parallel to adjacent main portions of said one component.

5. A lift truck as set forth in claim 4, wherein said web and flange means form a right angle.

6. A lift truck as set forth in claim 1, wherein both said shell and liner components include horizontal top and vertical front panels, said operator's, station being arranged generally above and forward of said cover, said operator's station including an operator's seat disposed above said cover and having a front edge adjacent the vertical front panel of the shell.

7. A lift truck as set forth in claim 6, wherein said shell and liner each include vertical side panels integral with said top and front panels.

8. A liner for an engine cover in a lift truck comprising an imperforate sheet of rigid plastic, said liner including at least two integral panel portions generally perpendicular to one another and forming a generally horizontal top and generally vertical front, the periphery of said liner having integrally formed mounting flange elements extending generally parallel to and spaced generally a uniform distance from adjacent portions of the liner, a web integrally formed on the periphery of the liner and extending substantially continuously along the periphery of the liner between the flange elements and adjacent portions of the liner, said flange elements being adapted to be secured to the underside of an engine cover having the same general configuration as the liner whereby the liner is adapted to be spaced a predetermined distance from said cover, the central portions of said liner being substantially planar such that physical contact between the liner and the underside of the engine cover is avoided.

9. A lift truck comprising a chassis, a lifting mechanism at one end of the chassis, a prime mover on the chassis adjacent the rear end thereof opposite the lifting mechanism, an operator's station disposed on the chassis generally above and forward of the prime mover, said operator's station including a seat and a steering wheel, a cover disposed between the prime mover and the operator's station, said cover including a generally horizontal portion extending below said seat and a vertical portion depending vertically in a zone generally rearward of the forward edge of said seat, said horizontal and vertical cover portions being sufficiently large to intercept substantially all airborne noise originating at or immediately adjacent the prime mover, said cover including an outer shell and an inner liner, said shell and liner being relatively thin-walled, imperforate, rigid structures of generally the same configuration, said liner being molded of a nonporous plastic material chemically resistant to commonly used oils and greases and petroleum fuels, said liner being spaced a predetermined distance from said shell, a web extending generally continuously along the periphery of at least one of said components between said liner and said shell to maintain the predetermined distance between said liner and shell, said liner and shell being substantially free of support between one another beyond the periphery of said one component.

10. A lift truck as set forth in claim 9, including a cab enclosure surrounding said operator's station and a substantial portion of said cover.

* * * * *